(12) United States Patent
Paczkowski

(10) Patent No.: US 11,882,539 B2
(45) Date of Patent: Jan. 23, 2024

(54) NETWORK SLICE REGISTRAR VIRTUAL NETWORK FUNCTION

(71) Applicant: T-Mobile Innovations LLC, Overland Park, KS (US)

(72) Inventor: Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 203 days.

(21) Appl. No.: 17/351,814

(22) Filed: Jun. 18, 2021

(65) Prior Publication Data

US 2022/0408394 A1 Dec. 22, 2022

(51) Int. Cl.
| | |
|---|---|
| *H04W 60/04* | (2009.01) |
| *H04W 76/11* | (2018.01) |
| *H04W 24/08* | (2009.01) |
| *H04W 48/08* | (2009.01) |
| *H04W 48/18* | (2009.01) |

(52) U.S. Cl.
CPC ........... *H04W 60/04* (2013.01); *H04W 24/08* (2013.01); *H04W 48/18* (2013.01); *H04W 76/11* (2018.02)

(58) Field of Classification Search
CPC ..... H04W 60/04; H04W 76/11; H04W 24/08; H04W 48/18
See application file for complete search history.

(56) References Cited

U.S. PATENT DOCUMENTS

| | | | |
|---|---|---|---|
| 11,310,104 B2* | 4/2022 | Stockert | H04W 28/16 |
| 2019/0379664 A1* | 12/2019 | Suthar | H04W 4/70 |
| 2020/0057860 A1* | 2/2020 | Patil | G06F 21/6209 |
| 2020/0195495 A1* | 6/2020 | Parker | H04L 41/082 |

FOREIGN PATENT DOCUMENTS

| | | |
|---|---|---|
| WO | 201900197883 A1 | 10/2019 |
| WO | 20210025600 A1 | 2/2021 |
| WO | 20220265706 A1 | 12/2022 |

OTHER PUBLICATIONS

Foreign Communication From a Related Counterpart Application, International Search Report and Written Opinion dated Jul. 4, 2022 International Application No. PCT/US2022/021230 filed on Mar. 22, 2022.

* cited by examiner

*Primary Examiner* — Charles N Appiah
*Assistant Examiner* — Nicole M Louis-Fils

(57) ABSTRACT

A method of communicating over a plurality of network slices concurrently. The method comprises building a distributed ledger by a network slice registrar function (NSRF) application executing on a computer, where the distributed ledger records an association between a first network slice allocated to a user equipment (UE) and a second network slice allocated to the UE, providing information about the association of the UE to the first network slice and the second network slice by the NSRF application to a network slice selector function (NSSF), establishing a first communication link between the UE and a first call end point via the first network slice by a first user plane function (UPF) and establishing a second communication link between the UE and a second call end point via the second network slice by a second UPF based on the information provided by the NSRF application to the NSSF.

17 Claims, 8 Drawing Sheets

NETWORK SLICE REGISTRAR VIRTUAL NETWORK FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND 5G networks may support network slicing functionality. Each network slice may provide the behavior of an independent logical network, where multiple network slices are provided over the same physical network infrastructure. Network slicing can provide a variety of benefits to both individual users and enterprise users.

SUMMARY

In an embodiment, a method of managing a plurality of associated network slices is disclosed. The method comprises receiving information about a first network slice associated with a user equipment (UE) by a network slice registrar function (NSRF) application executing on a computer from a network slice selection function (NSSF), where the information about the first network slice comprises an identity of the UE and at least one parameter associated with the first network slice, building a first genesis block of a first distributed ledger associated with the first network slice by the NSRF application, where the first genesis block stores the identity of the UE and the at least one parameter associated with the first network slice, and initiating the first distributed ledger by the NSRF application with the first genesis block. The method further comprises receiving information about a second network slice associated with the UE by the NSRF application from the NSSF, where the information about the second network slice comprises the identity of the UE and at least one parameter associated with the second network slice, building a second genesis block of a second distributed ledger associated with the second network slice by the NSRF application, where the second genesis block stores the identity of the UE and the at least one parameter associated with the second network slice, and initiating the second distributed ledger by the NSRF application with the second genesis block. The method further comprises determining by the NSRF application that the first network slice is associated with the second network slice and, in response to determining that the first network slice is associated with the second network slice, building a third genesis block by the NSRF application, where the third genesis block identifies the UE, the first network slice, and the third network slice. The method further comprises monitoring events associated with the first network slice and with the second network slice by the NSRF application, adding blocks to the first distributed ledger that record events associated with the first network slice by the NSRF application, and adding blocks to the second distributed ledger that record events associated with the second network slice by the NSRF application. The method further comprises receiving a request to identify network slices associated with the UE by the NSRF application from an access and mobility management function (AMF), in response to receiving the request to identify network slices associated with the UE, reading from the third distributed ledger by the NSRF application; and returning a reply by the NSRF application to the AMF, wherein the reply identifies the network slices associated with the UE, whereby the AMF is enabled to efficiently interwork with a user plane function (UPF) associated with the UE.

In another embodiment, a method of managing a plurality of associated network slices is disclosed. The method comprises building a first distributed ledger by a network slice registrar function (NSRF) application executing on a computer, where the first distributed ledger records events associated with a first network slice allocated to a user equipment (UE) and where the NSRF application provides a virtual network function (VNF) in a 5G communication network, building a second distributed ledger by the NSRF application, where the second distributed ledger records events associated with a second network slice allocated to the UE, and building a third distributed ledger by the NSRF application, where the third distributed ledger records the association between the first network slice and the second network slice. The method further comprises receiving a notification by the NSRF application from a network slice selection function (NSSF), where the notification indicates that the second network slice is terminated, in response to receiving the notification, building a terminal block by the NSRF application, and adding the terminal block by the NSRF application to the third distributed ledger, thereby closing the third distributed ledger from any further growth. The method further comprises, after the third distributed ledger has been closed, auditing the third distributed ledger by the NSRF application and, based on the auditing, generating an activity report by the NSRF application, where the activity report comprises an identity of the UE and information about the concurrent operations of the first network slice and the second network slice.

In yet another embodiment, a method of communicating over a plurality of network slices concurrently is disclosed. The method comprises building a distributed ledger by a network slice registrar function (NSRF) application executing on a computer, where the distributed ledger records an association between a first network slice allocated to a user equipment (UE) and a second network slice allocated to the UE and providing information about the association of the UE to the first network slice and the second network slice by the NSRF application to a network slice selector function (NSSF). The method further comprises establishing a first communication link between the UE and a first call end point via the first network slice by a first user plane function (UPF) associated with the first network slice, wherein the first UPF receives information from the NSRF application about the association of the UE to the first network slice based on the information provided by the NSRF to the NSSF and establishing a second communication link between the UE and a second call end point via the second network slice by a second UPF associated with the second network slice, wherein the second UPF receives information from the NSRF application about the association of the UE to the second network slice based on the information provided by the NSRF to the NSSF, whereby the UE is enabled to communicate with two different call end points concurrently.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
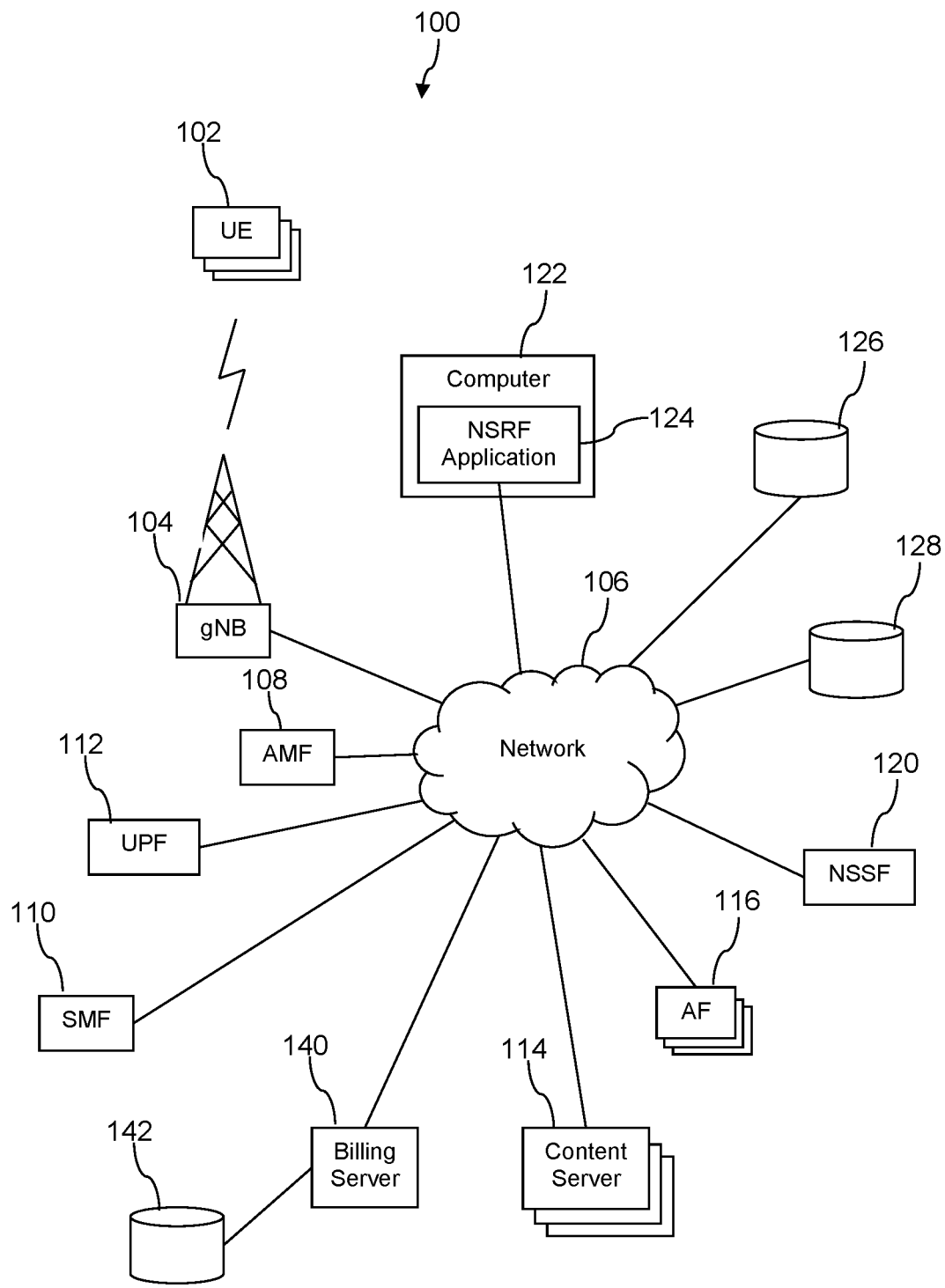
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

5G communication technologies provide support for network slicing functionality. A network slice provides the behavior of an independent logical network over a shared physical network infrastructure. As currently known, however, network slicing may be somewhat inflexible and/or clunky. The present disclosure teaches a system and method for improving 5G network slicing management, for example providing support for tracking and monitoring the association of a plurality of network slices to a single user equipment (UE) or to a single enterprise. Network slices are established by the network slice selection function (NSSF) in response to requests from a UE for communication resources. As taught herein, a network slice registrar function (NSRF) maintains information about network slices created by the NSSF and provides support for more sophisticated and flexible use of these network slices. In an embodiment, the NSRF is implemented as a new virtual network function (VNF) in a 5G core network. The NSRF will receive notifications from the NSSF on establishment of network slices and will provide information to the NSSF on request about network slices.

On notification of creation of a new network slice, the NSRF creates a new distributed ledger in a data store to represent the events associated with that network slice (changes in QoS parameters for the slice, data rate for the slice, incremental data tonnage consumed by the slice, other events). Each different event recorded would be captured in a new block attached to the distributed ledger. On notification of creation of another new network slice associated with the same UE, the NSRF creates another new distributed ledger in the data store, but also creates another distributed ledger that records the association of these two slices. This association distributed ledger can track any number of network slices associated with the same UE. For example, if a third network slice associated with the same UE is created, the NSRF creates another new distributed ledger in the data store to represent the events associated with that third network slice and adds a block to the association distributed ledger to track this third network slice with the first network slice and the second network slice that are all associated with the subject UE.

The NSRF supports the NSSF inquiring about network slices associated with the same UE, to support the NSSF better managing (or the application mobility function (AMF) better managing) the slices associated with the UE. To take advantage of the information tracked and collected by the NSRF, the conventional NSSF and/or the conventional AMF may be adapted and modified to request and use this information. For example, if the UE requests more communication resources, the NSSF may determine, through inquiring to the NSRF, that a network slice currently allocated to the subject UE is underutilized and can be repurposed or stretched to do double duty to support the resource increase the UE had requested. Currently, the conventional NSSF may not be able to determine that two different network slices are associated with the same UE and therefore may be unable to take advantage of this information to manage communications efficiently and effectively. In the example above, without the information provided by the NSRF, the NSSF may simply allocate the requested additional network slice requested by the UE, thereby unnecessarily increasing the numbers of network slices allocated and thereby increasing its processing burden. The system taught herein can support the UE user plane traffic in different network slices connecting through the packet data network to two or more termination UEs or two or more application functions, a scenario which may not otherwise be possible without the NSRF.

Turning now to FIG. 1, a communication system 100 is described. In an embodiment, the system 100 comprises a user equipment (UE) 102, a cell site 104, and a network 106. The cell site 104 may provide a wireless communication link to the UE 102 according to a 5G, a long-term evolution (LTE), a code division multiple access (CDMA), or a global system for mobile communication (GSM) telecommunication protocol. The cell site 104 may communicatively couple the UE 102 to the network 106 and therethrough to a variety of destination devices, for example to a content server 114 and/or an application function 116. The UE 102 may be a mobile phone, a smart phone, a personal digital assistant (PDA), a wearable computer, a laptop computer, a tablet computer, a notebook computer, or an Internet of things (IoT) device.

The communication coupling of the UE 102 to one or more destination devices may be supported by an access and mobility management function (AMF) 108, a session management function (SMF) 110, a user plane function (UPF) 112, and a network slice selection function (NSSF) 120. While the AMF 108, the SMF 110, the UPF 112, and the NSSF 120 are shown separately in FIG. 1 to promote discussing their role in the teachings of the current disclosure, it is understood that these may be considered to be part of the network 106. The network 106 may comprise one or more public networks, one or more private networks, or a combination thereof. As discussed hereinafter with reference to FIG. 5A and FIG. 5B, the AMF 108, the SMF 110, the UPF 112, and the NSSF 120 may be provided as virtualized network functions in a 5G core network. It is understood that the system 100 may comprise any number of UEs 102, any number of cell sites 104, any number of AMFs 108, any number of SMFs 110, any number of UPFs 112, any number of NSSFs 120, any number of content servers 114, and any number of application functions 116.

The system 100 further comprises a computer 122 that executes a network slice registrar function (NSRF) application 124. In an embodiment, the functionality of the NSRF application 124 may be provided as a virtualized network function and may be deployed as part of a 5G core network. When the UE 102 is allocated a first network slice by the NSSF 120, the NSRF application 124 takes note of this event and initiates a first distributed ledger for tracking events associated with the first network slice and stores the first distributed ledger in a data store 126. In an embodiment, the NSRF application 124 may register with the NSSF 120 to receive notifications when network slices are allocated to UEs 102. In another embodiment, the NSRF application 124 may periodically query or poll the NSSF 120 to obtain information about network slices that are allocated to UEs 102. The information the NSRF 124 receives about the network slices may identify the UE 102. The information the NSRF 124 receives about the network slices may further define one or more parameters, for example initial conditions associated with the network slice. These parameters may comprise an initial quality of service (QoS) assigned to the slice, a service level agreement (SLA) associated to the slice, a maximum nominal data throughput associated to the slice, and/or an initiation time associated to the slice.

The NSRF application 124 may build what may be referred to as a genesis block which serves as the base or root of the first distributed ledger. The genesis block may comprise an identity of the UE 102, an identity or identifier of the first network slice, a date and time that the first network slice was established, and initial values of parameters associated with the first network slice. The parameters of the first network slice may comprise a data rate, a quality of service (QoS), a service level agreement (SLA), and/or other communication parameters. The identity of the UE 102, the identity of the first network slice, the date and time the first network slice was established, and the initial values of parameters associated with the first network slice may be referred to as a content of the genesis block. The genesis block may comprise a nonce value and a hash value that is calculated over the nonce and the content of the genesis block. In an embodiment, the nonce value may be a random number selected so that the hash value satisfies a criteria, such as that the leading four digits of the hash value are all zeroes.

When events associated with the first network slice occur, the NSRF application 124 takes note of these events, builds a block whose content captures information about the events, and attaches this block to the first distributed ledger. In an embodiment, the NSRF application 124 builds a block for each different event associated with the first network slice. In another embodiment, the NSRF application 124 may collect a plurality of events associated with the first network slice and group this plurality of events into a single block that it adds to the first distributed ledger. These blocks storing information about events related to the first network slice may comprise the event information content, a hash of the previous block of the first distributed ledger, a nonce, and a hash over the block itself (e.g., a hash over the previous hash, the content, and the nonce). The nonce may be selected to satisfy a criteria, for example that the leading four digits of the hash are all zeroes. In an embodiment, the NSRF application 124 may register with the NSSF 120 to receive notifications when events related to the network slices occur. In another embodiment, the NSRF application 124 may periodically query or poll the NSSF 120 to obtain information about events related to network slices.

When the UE 102 is allocated a second network slice by the NSSF 120, the NSRF application 124 takes note of this event and initiates a second distributed ledger associated with the second network slice and stores the second distributed ledger in the data store 126. The NSRF application 124 may build a genesis block to initiate the second distributed ledger and to add event blocks to the second distributed ledger in a like manner to how it initiated and builds the first distributed ledger, with the provision that the information in the second distributed ledger is related instead to the second network slice. The first distributed ledger that tracks events associated with the first network slice and the second distributed ledger that tracks events associated with the second network slice may be referred to as network slice event distributed ledgers.

When two network slices are active for the same UE 102 at the same time, the NSRF application 124 tracks the association between these two network slices and supports rapid determination that two or more network slices are allocated to the subject UE 102 and rapid identification of the two or more network slices. In an embodiment, when a second network slice is allocated to the UE 102, the NSRF application 124 determines that two network slices are allocated to the UE 102 and initiates a third distributed ledger for maintaining information about the association between the two network slices. This third distributed ledger may be referred to as a network slice association distributed ledger. If additional network slices—e.g., a third network slice, a fourth network slice, or more—are allocated to the UE 102, the NSRF application 124 takes note of this circumstance and updates the third distributed ledger accordingly, for example by adding a new block containing information related to the additional network slice. The third distributed ledger may be stored in a second data store 128 separate from the data store 126. Alternatively, in an embodiment, the first distributed ledger, the second distributed ledger, and the third distributed ledger may all be stored in a common data store, for example in the data store 126.

The third distributed ledger may comprise a genesis block whose content identifies the active network slices associated with the UE 102 and the identity of the UE 102. The content of the genesis block of the third distributed ledger may also identify the first distributed ledger and the second distributed ledger. The genesis block may further comprise a nonce and a hash over the nonce and the content. If another network slice is allocated to the UE 102, the NSRF application 124 builds a new block whose content includes the identities of all the currently allocated network slices associated to the UE 102. The new block comprises the hash of the previous block, a nonce, and a hash over the previous hash, the nonce, and the content. The content of the new block may further comprise the identity of the first distributed ledger associated with the first network slice allocated to the UE 102, the identity of the second distributed ledger associated with the second network slice, and the identity of a fourth distributed ledger associated with the third network slice. If a network slice allocated to the UE 102 is terminated or destroyed, the NSRF application 124 builds a new block whose content includes the identities of the currently allocated network slices associated to the UE 102 (e.g., removes the identity of the terminated network slice). To identify all the active network slices allocated to the UE 102, the NSRF application 124 looks at the last block of the third distributed ledger.

The NSRF application 124 provides an application programming interface (API) that may be invoked by other virtual network functions, for example accessed by the NSSF 120 or by the AMF 108 or by other virtual network functions. The AMF 108 may inquire how many network slices are currently allocated to the UE 102, and the AMF 108 may use this information returned by the NSRF application 124 to determine whether to allocate an additional network slice to the UE 102 or rather to direct the UE 102 to redistribute its communication needs among its already allocated network slices more efficiently. For example, the UE 102 may be allocated a first network slice that is 10% utilized and may be allocated a second network slice that is 90% utilized. Noticing the 90% utilization on the second slice, the UE 102 may request a third network slice be allocated to it. This would be inefficient management of network slicing resources, from the perspective of the core network. Instead, it may be preferred to prompt the UE 102 to use its already allocated network slice resources in a more balanced form. The query to the network slice association distributed ledger (e.g., the third distributed ledger) may identify the UE 102, and the NSRF application 124 uses the identity of the UE 102 to locate the network slice association distributed ledger based on the identity of the UE 102. Alternatively, if the NSRF application 124 does not find a network slice association distributed ledger based on the identity of the UE 102, the NSRF application 124 may search for a network slice event distributed ledger based on the identity of the UE 102.

While the description above relates to the NSRF application 124 tracking, recording, and responding to queries related to network slices allocated to the UE 102, it is understood that the NSRF application 124 is performing this same tracking, recording, and query servicing function for a plurality of UEs 102. Additionally, the NSRF application 124 may track, record, respond to queries related to network slices allocated to other entities. The NSRF application 124 may track, record, and respond to queries related to network slices allocated to an enterprise. The NSRF application 124 may track, record, and respond to queries related to network slices allocated to a related group of Internet of things (IoT) devices.

In an embodiment, two different network slices associated with the UE 102 each comprises its own independent UPF 112, and each independent UPF 112 is communicatively coupling the UE 102 to a different communication end point, for example a first UPF 112 coupling the UE 102 to a content server 114 and a second UPF 112 coupling the UE 102 to an application function 116. The NSRF application 124 can help the AMF 108 interwork with the several UPFs 112 to support the communication coupling to distinct and independent communication end points by querying the NSRF application 124 about the network slices associated with the same UE 102. In an embodiment, the AMF 108 may ask the NSSF 120 to broker its query to the NSRF application 124 on its behalf.

In an embodiment, the system 100 further comprises a billing server 140 and a billing data store 142. The billing server 140 is communicatively coupled to the network 106 and may have access to the data store 126 and the data store 128. The billing server 140 may generate a bill for the UE 102 based on evaluating how many network slices are allocated to the UE 102 at the same time. The billing server 140 may generate the bill for the UE 102 in part based on network parameters associated with each different network slice allocated to the UE 102, for example a data rate, a QoS, or a SLA supported for each different network slice and a time duration of each network slice. But in addition to these considerations, the billing server 140 may take into consideration that two or more network slices were allocated concurrently and adapt the bill for the UE 102 accordingly. For example, the communication service provided by two network slices concurrently may be deemed more valuable and be billed at a higher rate than the sum of the value of each network slice considered independently.

Figure 2A:
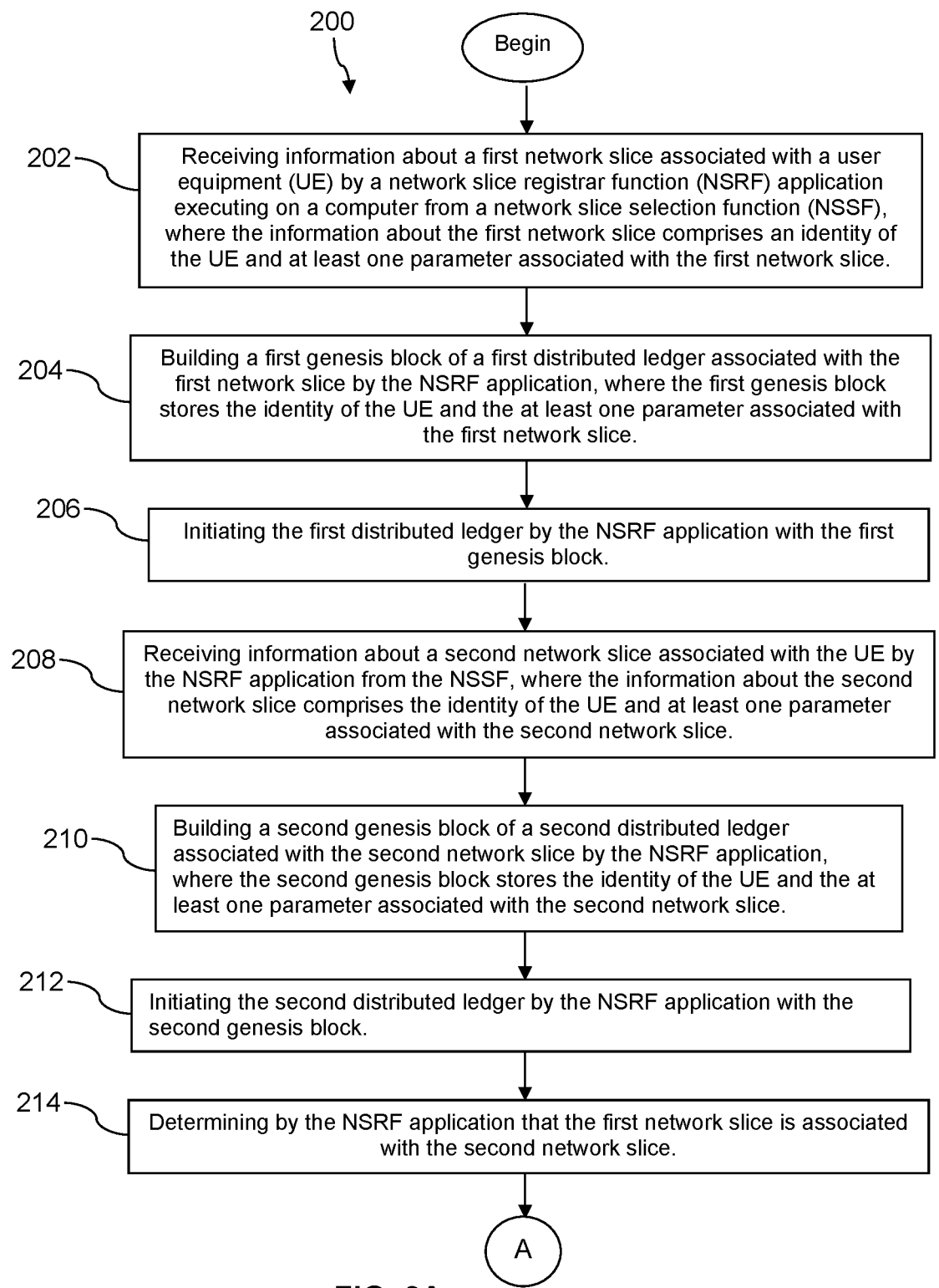
FIG. 2A and FIG. 2B are a flow chart of a method according to an embodiment of the disclosure.
Figure 2B:
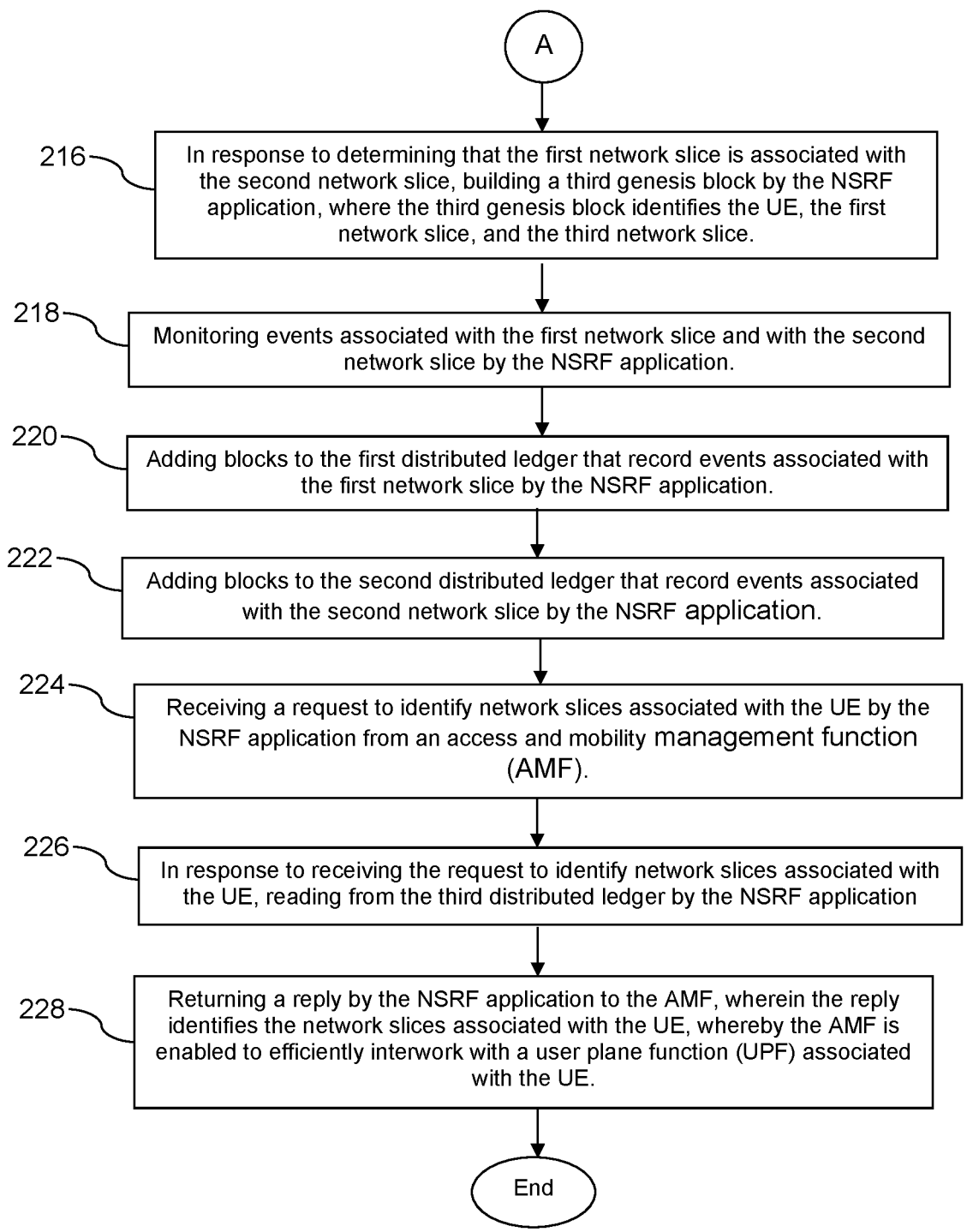

Turning now to FIG. 2A and FIG. 2B, a method 200 is described. In an embodiment, the method 200 is a method of managing a plurality of associated network slices. At block 202, the method 200 comprises receiving information about a first network slice associated with a user equipment (UE) by a network slice registrar function (NSRF) application executing on a computer from a network slice selection function (NSSF), where the information about the first network slice comprises an identity of the UE and at least one parameter associated with the first network slice. In an embodiment, the NSRF application provides a virtual network function in a 5G core network.

At block 204, the method 200 comprises building a first genesis block of a first distributed ledger associated with the first network slice by the NSRF application, where the first genesis block stores the identity of the UE and the at least one parameter associated with the first network slice.

At block 206, the method 200 comprises initiating the first distributed ledger by the NSRF application with the first genesis block.

At block 208, the method 200 comprises receiving information about a second network slice associated with the UE by the NSRF application from the NSSF, where the information about the second network slice comprises the identity of the UE and at least one parameter associated with the second network slice. At block 210, the method 200 comprises building a second genesis block of a second distributed ledger associated with the second network slice by the NSRF application, where the second genesis block stores the identity of the UE and the at least one parameter associated with the second network slice. At block 212, the method 200 comprises initiating the second distributed ledger by the NSRF application with the second genesis block.

At block 214, the method 200 comprises determining by the NSRF application that the first network slice is associated with the second network slice. At block 216, the method 200 comprises, in response to determining that the first network slice is associated with the second network slice, building a third genesis block by the NSRF application, where the third genesis block identifies the UE, the first network slice, and the third network slice.

At block 218, the method 200 comprises monitoring events associated with the first network slice and with the second network slice by the NSRF application. In an embodiment, an event monitored by the NSRF application may be a change of quality of service (QoS) associated with the first network slice. In an embodiment, an event monitored by the NSRF application may be a change of data rate associated with the first network slice. In an embodiment, an event monitored by the NSRF application may be an incremental data tonnage consumed by the first network slice. In an embodiment, at least some of the events monitored by the NSRF application are received from a unified data management (UDM) network function. In an embodiment, at least some of the events monitored by the NSRF application are received from a policy control function (PCF) network function. At block 220, the method 200 comprises adding blocks to the first distributed ledger that record events associated with the first network slice by the NSRF application. At block 222, the method 200 comprises adding blocks to the second distributed ledger that record events associated with the second network slice by the NSRF application.

At block 224, the method 200 comprises receiving a request to identify network slices associated with the UE by the NSRF application from an access and mobility management function (AMF). In an embodiment, the NSRF application receives the request from the AMF via a network slice selection function (NSSF). At block 226, the method 200 comprises, in response to receiving the request to identify network slices associated with the UE, reading from the third distributed ledger by the NSRF application.

At block 228, the method 200 comprises returning a reply by the NSRF application to the AMF, wherein the reply identifies the network slices associated with the UE, whereby the AMF is enabled to efficiently interwork with a user plane function (UPF) associated with the UE.

Figure 3:
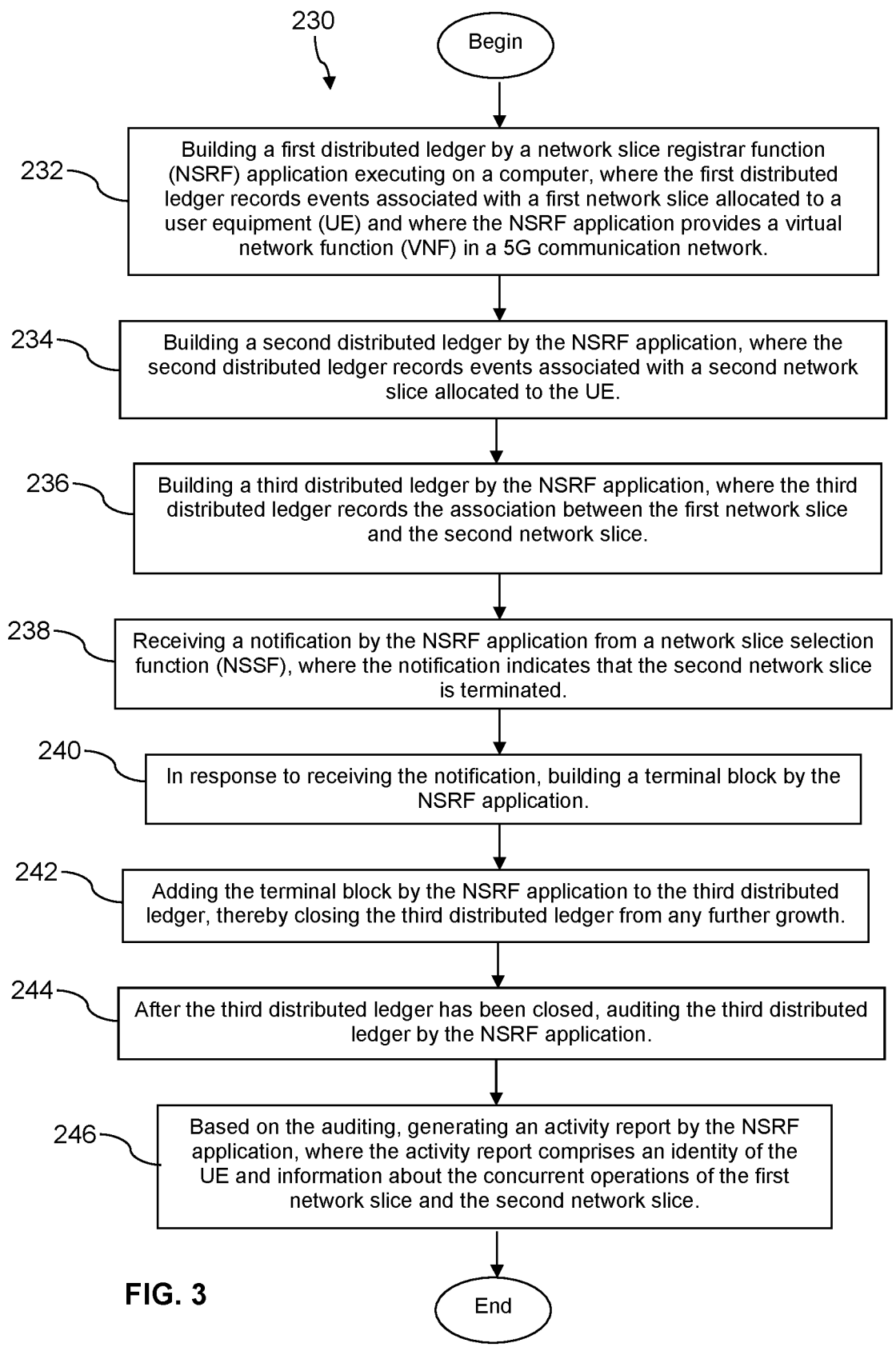
FIG. 3 is a flow chart of another method according to an embodiment of the disclosure.

Turning now to FIG. 3, a method 230 is described. In an embodiment, the method 230 is a method of managing a plurality of associated network slices. At block 232, the method 230 comprises building a first distributed ledger by a network slice registrar function (NSRF) application executing on a computer, where the first distributed ledger records events associated with a first network slice allocated to a user equipment (UE) and where the NSRF application provides a virtual network function (VNF) in a 5G communication network, for example in a 5G core network. At block 234, the method 230 comprises building a second distributed ledger by the NSRF application, where the second distributed ledger records events associated with a second network slice allocated to the UE. At block 236, the method 230 comprises building a third distributed ledger by the NSRF application, where the third distributed ledger records the association between the first network slice and the second network slice.

At block 238, the method 230 comprises receiving a notification by the NSRF application from a network slice selection function (NSSF), where the notification indicates that the second network slice is terminated. At block 240, the method 230 comprises in response to receiving the notification, building a terminal block by the NSRF application. At block 242, the method 230 comprises adding the terminal block by the NSRF application to the third distributed ledger, thereby closing the third distributed ledger from any further growth.

At block 244, the method 230 comprises, after the third distributed ledger has been closed, auditing the third distributed ledger by the NSRF application. At block 246, the method 230 comprises, based on the auditing, generating an activity report by the NSRF application, where the activity report comprises an identity of the UE and information about the concurrent operations of the first network slice and the second network slice.

In an embodiment, the method 230 further comprising analyzing the activity report by a billing application executing on a computer system to generate a bill for the UE. In an embodiment, the bill for the UE reflects a concurrent usage of the first network slice by the UE and of the second network slice by the UE.

In an embodiment, the method 230 further comprises building a fourth distributed ledger by the NSRF application, where the fourth distributed ledger records events associated with a third network slice allocated to the UE; building an association block by the NSRF application identifying the association between the first network slice, the second network slice, and the third network slice; and adding the association block by the NSRF application to the third distributed ledger.

Figure 4:
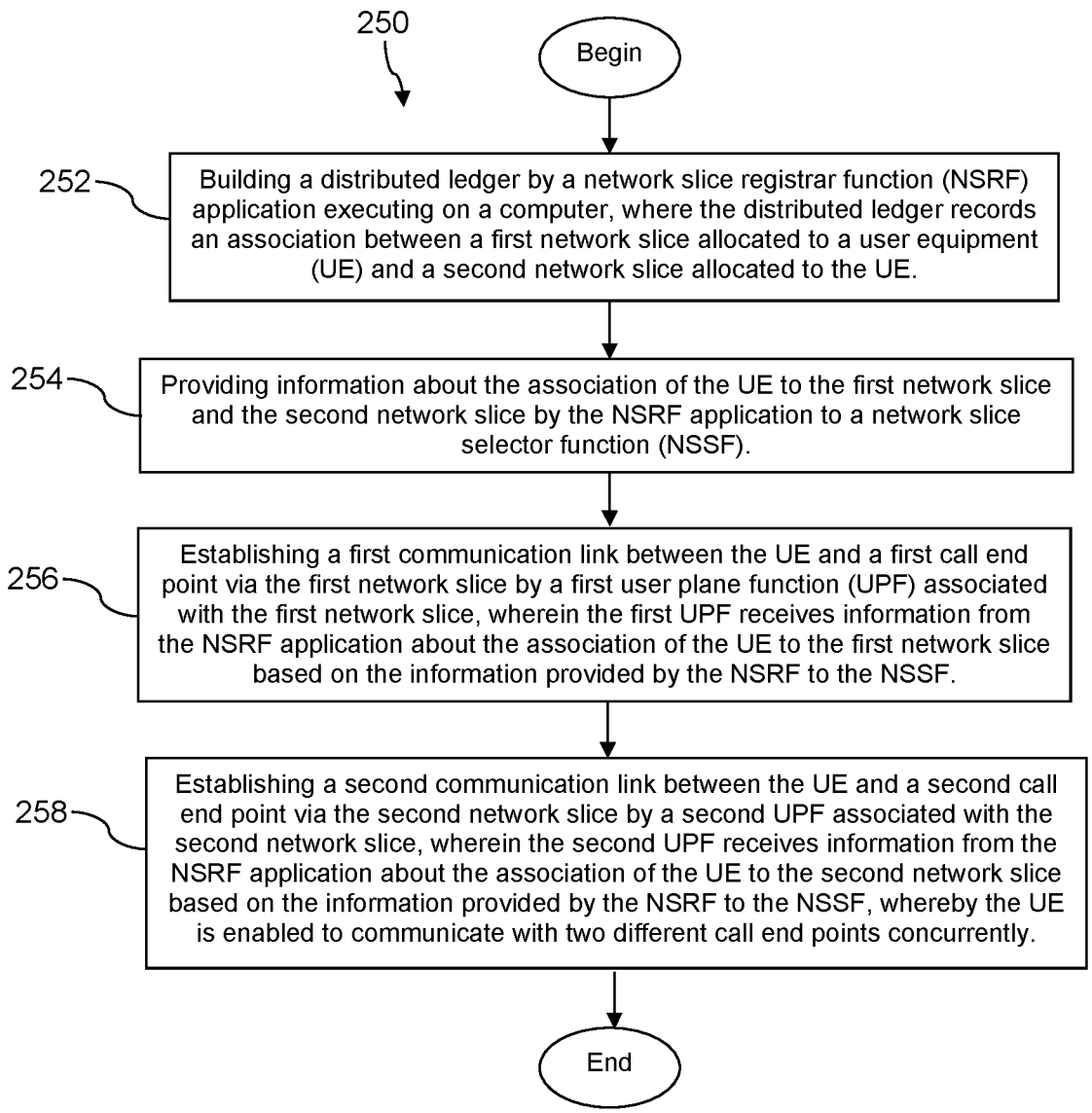
FIG. 4 is a flow chart of yet another method according to an embodiment of the disclosure.

Turning now to FIG. 4, a method 250 is described. In an embodiment, method 250 is a method of communicating over a plurality of network slices concurrently. At block 252, the method 250 comprises building a distributed ledger by a network slice registrar function (NSRF) application executing on a computer, where the distributed ledger records an association between a first network slice allocated to a user equipment (UE) and a second network slice allocated to the UE.

At block 254, the method 250 comprises providing information about the association of the UE to the first network slice and the second network slice by the NSRF application to a network slice selector function (NSSF). In an embodiment, the NSRF application provides a virtual network function in a 5G core network, the NSRF application provides an application programming interface (API), and the NSRF application provides the information about the association of the UE to the first network slice and to the second network slice in response to the NSSF invoking the API of the NSRF application.

At block 256, the method 250 comprises establishing a first communication link between the UE and a first call end point via the first network slice by a first user plane function (UPF) associated with the first network slice, wherein the first UPF receives information from the NSRF application about the association of the UE to the first network slice based on the information provided by the NSRF to the NSSF. In an embodiment, the first call end point is a content server. At block 258, the method 250 comprises establishing a second communication link between the UE and a second call end point via the second network slice by a second UPF associated with the second network slice, wherein the second UPF receives information from the NSRF application about the association of the UE to the second network slice based on the information provided by the NSRF to the NSSF, whereby the UE is enabled to communicate with two different call end points concurrently. In an embodiment, the second call end point is an application function or an application server. In an embodiment, the method 250 further comprises the NSRF application building a second distributed ledger storing information about events associated with the first network slice.

Figure 5A:
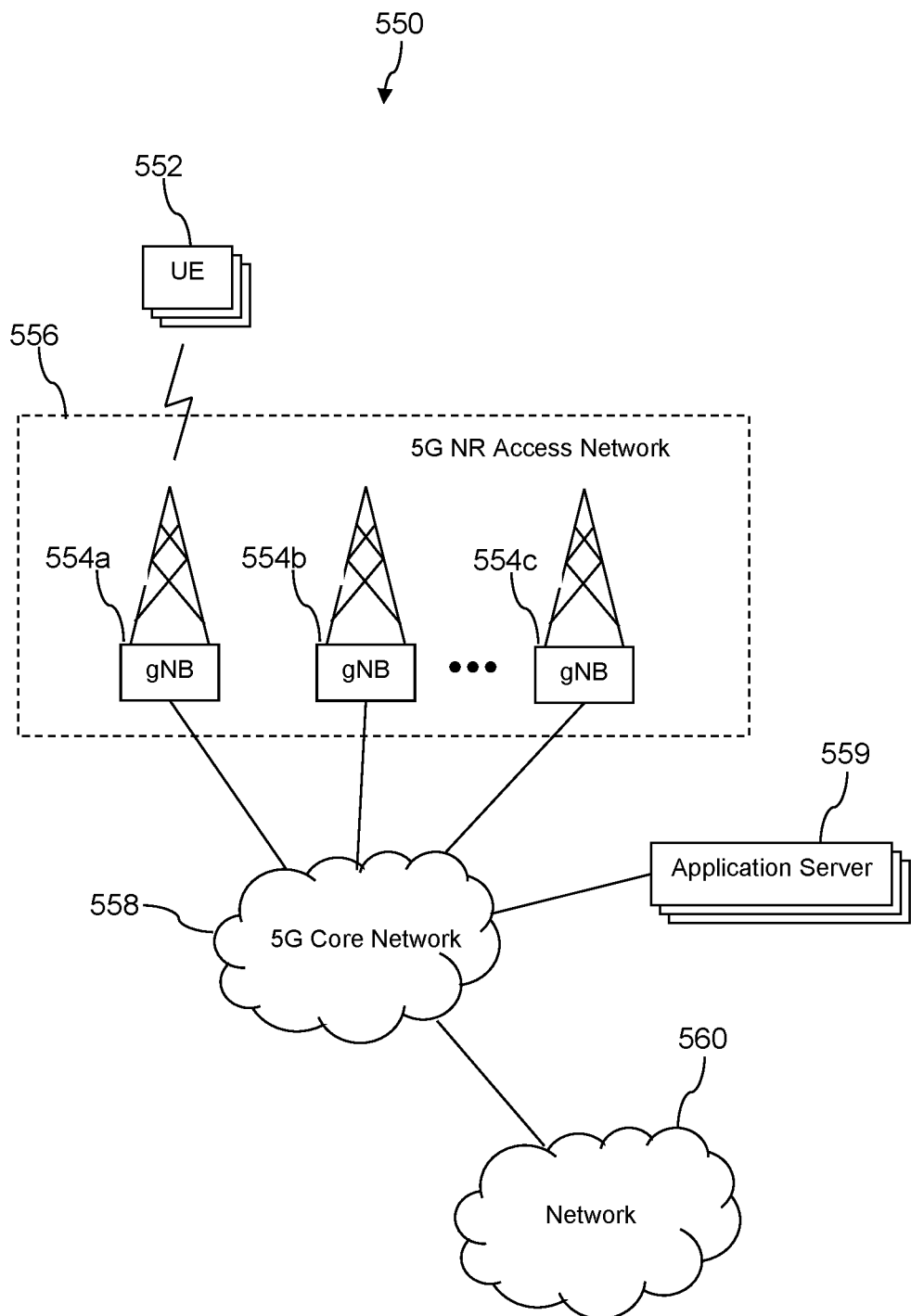
FIG. 5A and FIG. 5B are a block diagram of a 5G communication network according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
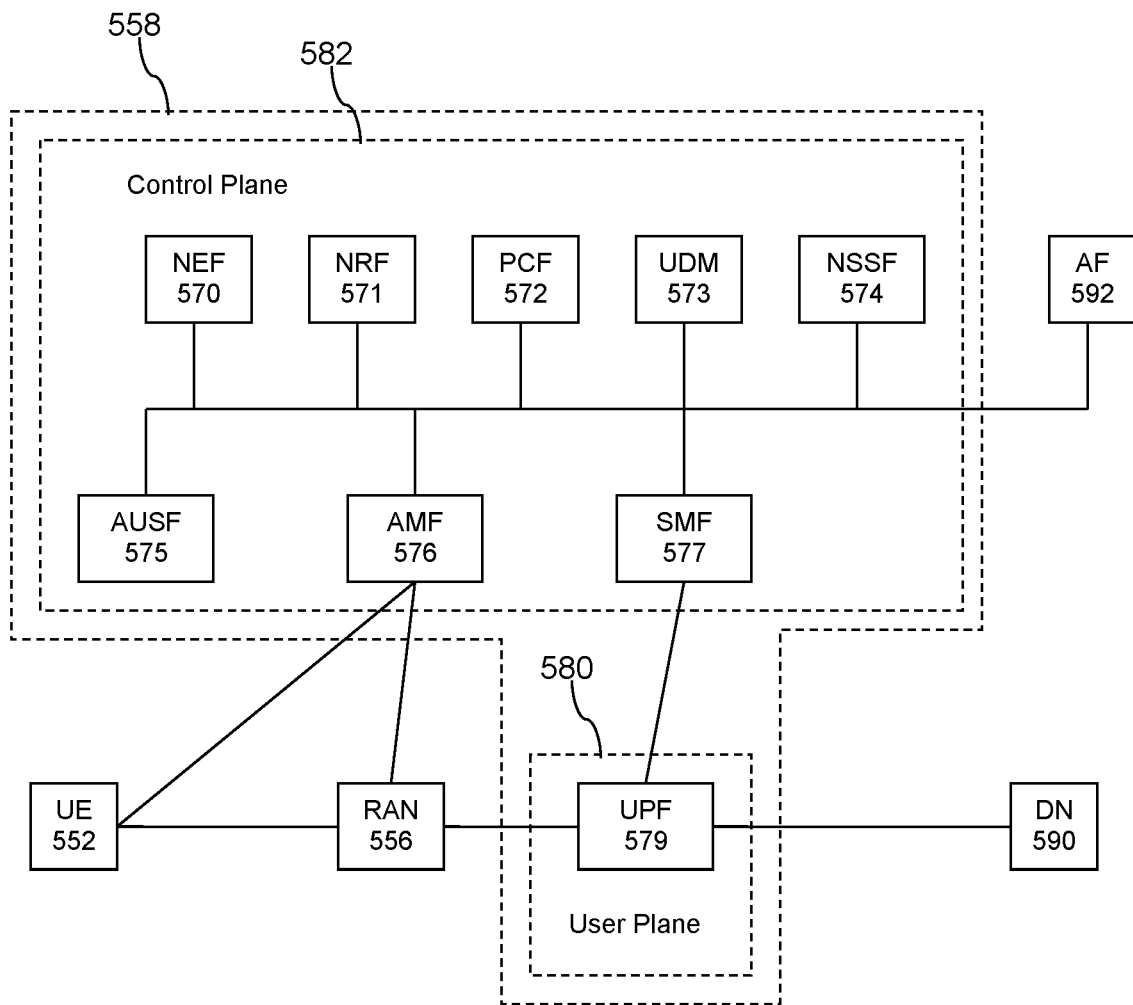

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF)

574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
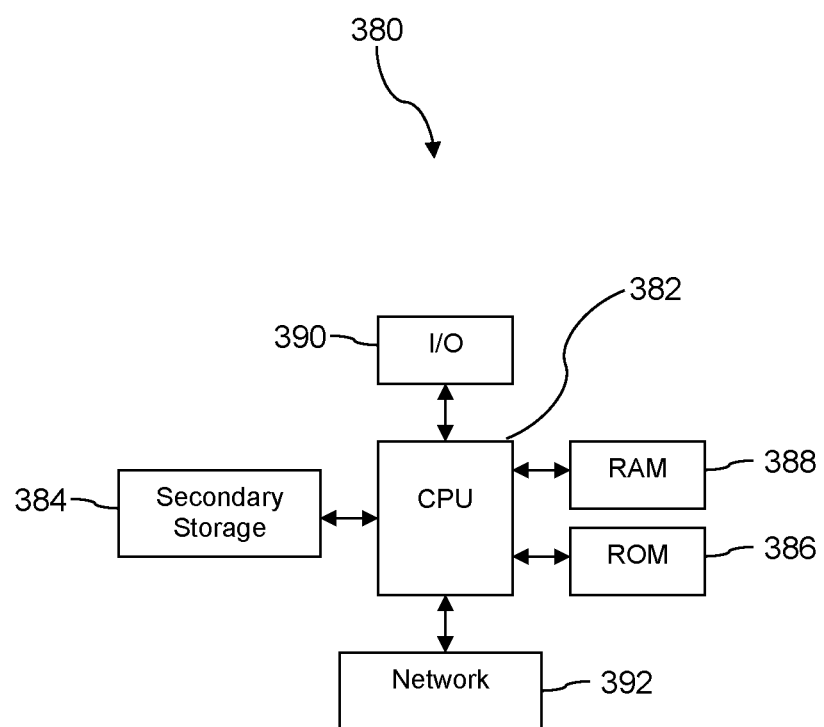
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a plurality of associated network slices, comprising:

receiving, by a network slice registrar function (NSRF) application executing on a computer, the receiving from a network slice selection function (NSSF), information about a first network slice associated with a user equipment (UE), where the information about the first network slice comprises an identity of the UE and at least one parameter associated with the first network slice;

building a first genesis block of a first distributed ledger associated with the first network slice by the NSRF application, where the first genesis block stores the identity of the UE and the at least one parameter associated with the first network slice;

initiating the first distributed ledger by the NSRF application with the first genesis block;

receiving, by the NSRF application from the NSSF, information about a second network slice associated with the UE, where the information about the second network slice comprises the identity of the UE and at least one parameter associated with the second network slice;

building a second genesis block of a second distributed ledger associated with the second network slice by the NSRF application, where the second genesis block stores the identity of the UE and the at least one parameter associated with the second network slice;

initiating the second distributed ledger by the NSRF application with the second genesis block;

determining by the NSRF application that the first network slice is associated with the second network slice;

in response to determining that the first network slice is associated with the second network slice, building a third genesis block of a third distributed ledger by the NSRF application, where the third genesis block identifies the UE, the first network slice, and the second network slice;

monitoring events associated with the first network slice and with the second network slice by the NSRF application;

adding blocks to the first distributed ledger that record events associated with the first network slice by the NSRF application;

adding blocks to the second distributed ledger that record events associated with the second network slice by the NSRF application;

receiving a request to identify network slices associated with the UE by the NSRF application from an access and mobility management function (AMF);

in response to receiving the request to identify network slices associated with the UE, reading from the third distributed ledger by the NSRF application;

returning a reply by the NSRF application to the AMF, wherein the reply identifies the network slices associated with the UE, whereby the AMF is enabled to efficiently interwork with a user plane function (UPF) associated with the UE;

receiving a notification by the NSRF application from a network slice selection function (NSSF), where the notification indicates that the second network slice is terminated;

in response to receiving the notification, building a terminal block by the NSRF application; and adding the terminal block by the NSRF application to the third distributed ledger, thereby closing the third distributed ledger from any further growth.

2. The method of claim 1, wherein the UE is a mobile phone, a smart phone, a personal digital assistant (PDA), a wearable computer, a laptop computer, a tablet computer, a notebook computer, or an Internet of things (IoT) device.

3. The method of claim 1, where the events associated with the first network slice comprise change of quality of service (QoS).

4. The method of claim 1, where the events associated with the first network slice comprise change of a data rate.

5. The method of claim 1, wherein the NSRF application provides a virtual network function in a 5G core network.

6. The method of claim 1, wherein the NSRF application receives the request to identify network slices associated with the UE from the AMF via a network slice selection function (NSSF).

7. The method of claim 1, wherein at least some of the events monitored by the NSRF application are received by the NSRF application from a unified data management (UDM) network function.

8. The method of claim 1, wherein at least some of the events monitored by the NSRF application are received by the NSRF application from a policy control function (PCF) network function.

9. The method of claim 1, further comprising:
- after the third distributed ledger has been closed, auditing the third distributed ledger by the NSRF application; and
- based on the auditing, generating an activity report by the NSRF application, where the activity report comprises an identity of the UE and information about the concurrent operations of the first network slice and the second network slice.

10. The method of claim 9, further comprising analyzing the activity report by a billing application executing on a computer system to generate a bill for the UE.

11. The method of claim 10, wherein the bill for the UE reflects a concurrent usage of the first network slice by the UE and of the second network slice by the UE.

12. The method of claim 1, further comprising:
- building a fourth distributed ledger by the NSRF application, where the fourth distributed ledger records events associated with a third network slice allocated to the UE;
- building an association block by the NSRF application identifying the association between the first network slice, the second network slice, and the third network slice; and
- adding the association block by the NSRF application to the third distributed ledger.

13. The method of claim 1, further comprising establishing a first communication link between the UE and a first call end point via the first network slice by a first user plane function (UPF) associated with the first network slice, wherein the first UPF receives information from the NSRF application about the association of the UE to the first network slice based on the information provided by the NSRF to the NSSF.

14. The method of claim 13, further comprising establishing a second communication link between the UE and a second call end point via the second network slice by a second UPF associated with the second network slice, wherein the second UPF receives information from the NSRF application about the association of the UE to the second network slice based on the information provided by the NSRF to the NSSF, whereby the UE is enabled to communicate with two different call end points concurrently.

15. The method of claim 13, wherein the NSRF application provides a virtual network function in a 5G core network, the NSRF application provides an application programming interface (API), and the NSRF application provides the information about the association of the UE to the first network slice and to the second network slice in response to the NSSF invoking the API of the NSRF application.

16. The method of claim 13, wherein the first call end point is a content server.

17. The method of claim 16, wherein the second call end point is an application function.

* * * * *